United States Patent [19]

Kokubu

[11] Patent Number: 5,138,182
[45] Date of Patent: Aug. 11, 1992

[54] APPARATUS FOR CONTROLLING POWER WINDOW REGULATOR

[75] Inventor: Sadao Kokubu, Niwa, Japan

[73] Assignee: Kabushiki Kaisha Tokai-Rika-Denki-Seisakusho, Niwa, Japan

[21] Appl. No.: 384,990

[22] Filed: Jul. 25, 1989

[30] Foreign Application Priority Data

Jul. 28, 1988 [JP] Japan .................... 63-190139
Aug. 24, 1988 [JP] Japan .................... 63-211492

[51] Int. Cl.$^5$ .................... H02P 1/22
[52] U.S. Cl. .................... 307/10.1; 318/266; 49/28; 49/31
[58] Field of Search .................... 307/9.1, 10.1, 38, 39, 307/592, 112, 116, 115; 361/139, 160, 170; 296/146, 147; 280/727; 318/139, 266, 282, 484; 49/24, 31, 32, 26, 28, 136; 180/289

[56] References Cited

U.S. PATENT DOCUMENTS 4,376,896 3/1983 Takeda et al. .................... 307/115
4,678,975 7/1987 Vrabel et al. .................... 318/266
4,689,450 8/1987 Sawada .................... 200/6 R Primary Examiner—A. D. Pellinen
Assistant Examiner—David Osborn
Attorney, Agent, or Firm—Oliff & Berridge

[57] ABSTRACT

An apparatus for controlling a power window capable of maintaining an energized state of the motor to move a window glass, detecting a locked-rotor current flowing through the motor when the window glass reaches a limit position, and de-energizing the motor to stop the movement of the window glass when the locked-rotor current becomes larger than a predetermined value. The period of time for energization of the motor is longer than a period of time from a moment at which the "ON" operation of the automatic mode switch is cancelled to a moment at which the window glass reaches the limit position. It is thereby possible to automatically de-energize the motor when the window glass reaches the limit position, even if the locked-rotor current does not become larger than the predetermined value at this time due to the influence of temperatures or other causes.

20 Claims, 8 Drawing Sheets

APPARATUS FOR CONTROLLING POWER WINDOW REGULATOR

BACKGROUND OF THE INVENTION

1. Field of the Invention

This invention relates to an apparatus for controlling a power window regulator for opening or closing a window of a vehicle or the like by moving the window glass and, more particularly, to an apparatus for controlling a power window regulator in which, once an automatic mode switch is turned on, energization of the motor is continued even after the "ON" operation of this switch has been cancelled, thereby enabling the window glass to be automatically moved to a limited position.

2. Description of Related Art

A type of controller for a power window regulator provided in a door of a vehicle on the driver's side has a manual mode switch and an automatic mode switch provided as a means for operating the controller. Ordinarily, this type of controller has a construction described below. A relay is provided to control the energization of the motor for moving the window glass upward or downward. When the manual mode switch is turned on, the relay is operated to form a circuit for the energization of the motor. The window glass is moved upward or downward only for the period of time that the manual mode switch is in the "ON" state, thereby enabling the window glass to be moved to the desired position. A retention circuit is provided which maintains the operating state of the relay (that is forming the motor energization circuit), once the relay is operated, by turning on the automatic mode switch. This occurs even after the automatic mode switch has been turned off. An auto-stop circuit is also provided which detects a locked-rotor current which flows through the motor during the energization of the motor based on the maintained state of the relay. When the locked-rotor current is detected, the auto-stop circuit cancels the maintenance of the operating state of the relay that is effected by the retention circuit. Consequently, once the automatic mode switch is turned on, even for a short time, the operating state of the relay is maintained by the retention circuit even after the automatic mode switch has been turned off, thereby continuing the energization of the motor. Hence, the (upward or downward) movement of the window glass. When the window glass that is moved in this way reaches a limited position (at which it completely closes or opens the window), a locked-rotor current flows through the motor. The auto-stop circuit detects this locked-rotor current and cancels the operation of the relay, thereby automatically stopping the energization of the motor in response to the window glass reaching the limited position.

However, once the locked-rotor current starts flowing through the motor, it decreases as the temperature of the motor winding increases. In some cases, the locked-rotor current becomes lower than a threshold level for detection of the locked-rotor current in the auto-stop circuit. In such an event, the operation maintained by the retention circuit is not cancelled and the energization of the motor continues uncontrollably, resulting in the risk of the motor abnormally heating as well as the risk of an increase in the rate at which the vehicle battery, serving as the power source of the power window, is consumed.

SUMMARY THE INVENTION

In view of these circumstances, an object of the present invention is to provide an apparatus for controlling a power window regulator that is capable of preventing the energization of the motor for opening/closing the window glass from being continued for an excessively long time after the motor has been locked, and therefore capable of preventing the occurrence of any abnormal state, e.g., overheating of the motor or an increase in the power consumption rate.

A further object of the present invention is to provide an apparatus for controlling a power window regulator which can be realized without the use of a complicated circuit to achieve the above preventive functions.

To these ends, the present invention provides an apparatus for controlling a power window regulator which drives a motor that moves a window glass, thereby opening or closing the window, the apparatus comprising:

maintenance means for maintaining an energization circuit for supplying a current to a motor in a state of supplying the current to the motor until a predetermined time elapses after the time at which an automatic mode switch is turned on;

means for detecting the current flowing through the motor; and means for cancelling the current supplying state maintained by the maintenance means when the current flowing through the motor exceeds a predetermined value.

In accordance with the present invention, when the automatic mode switch is turned on, the energization circuit for supplying the drive current to the motor is maintained in the state of supplying the current to the motor. This state is maintained for a predetermined period of time which is, preferably, longer than a period of time from a moment at which the "ON" operation of the automatic mode switch is cancelled to a moment at which the window glass thereafter reaches a limited position. Even if the automatic mode switch is turned off within the predetermined period of time by cancelling the "ON" operation, the formation of the motor energization circuit is thereafter continued, thereby enabling the operation of opening or closing the window glass. When the window glass that is moved in this way, reaches the limited position (at which it completely closes or opens the window), a rotor in the motor is locked and a lock-rotor current flows through the motor so that the motor current becomes larger than the predetermined value, and the cancellation means cancels the formation of the energization circuit maintained by the maintenance means, thereby automatically de-energizing the motor. Even the case where the locked-rotor current flows, it decreases as the temperature of the winding of the motor increases so that the automatic de-energization operation, based on the cancellation means, is not started. The maintenance of the motor energization circuit is cancelled when the predetermined time elapses, thereby disconnecting the energization circuit. It is therefore possible to prevent the energization of the motor for opening/closing the window glass from being continued for an excessively long time after a rotor in the motor has been locked hence preventing the occurrence of any abnormal state such as the motor overheating or the increase in power consumption rate.

To provide the above-described kind of timer function, it is necessary to further add an automatic mode cancelling function. This is a function for cancelling the operation of automatically moving the window glass in the automatic mode after the automatic mode switch has been turned on. It is possible that the circuit arrangement will thereby become complicated. To overcome this problem, the manual switch already provided in the power window system may be utilized in such a manner that the automatic mode is cancelled by the operation of turning on the manual switch. Thus, it is possible to utilize the existing switch in order to avoid an increase in the intricacy of the circuit arrangement.

BRIEF DESCRIPTION OF THE DRAWINGS

FIGS. 1 to 6 show an embodiment of the present invention;

FIG. 1 is a diagram of electrical connections;

FIG. 2 is cross-sectional view taken along line II—II of FIG. 4;

FIG. 3 is a cross-sectional view taken along line III—III of FIG. 4;

FIG. 4 is a transverse sectional view;

FIG. 5 is a perspective view of a movable contact member;

DESCRIPTION OF THE PREFERRED EMBODIMENTS

A first embodiment of the present invention will be described below will reference to FIGS. 1 to 6. This embodiment exemplifies a case where the present invention is applied, to an apparatus for controlling a power window regulator on the driver's side of a vehicle.

Figure 2:
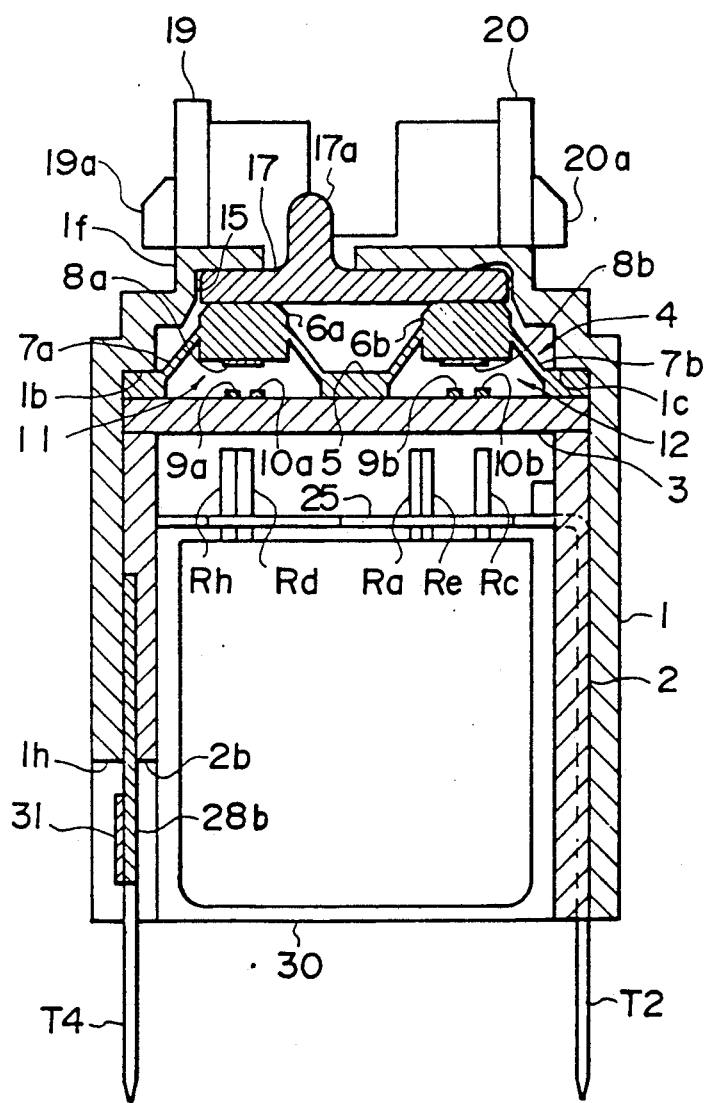
Figure 3:
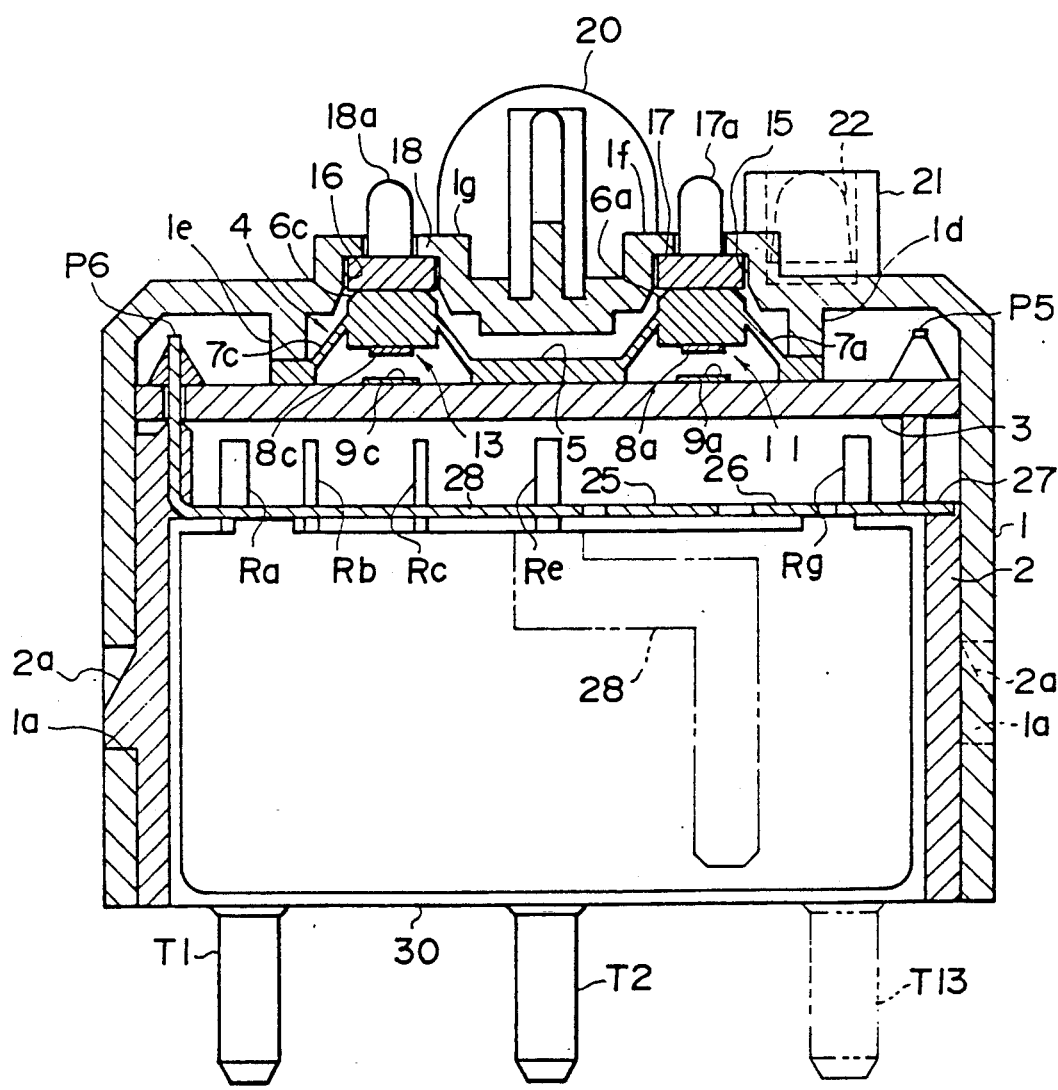
Figure 4:
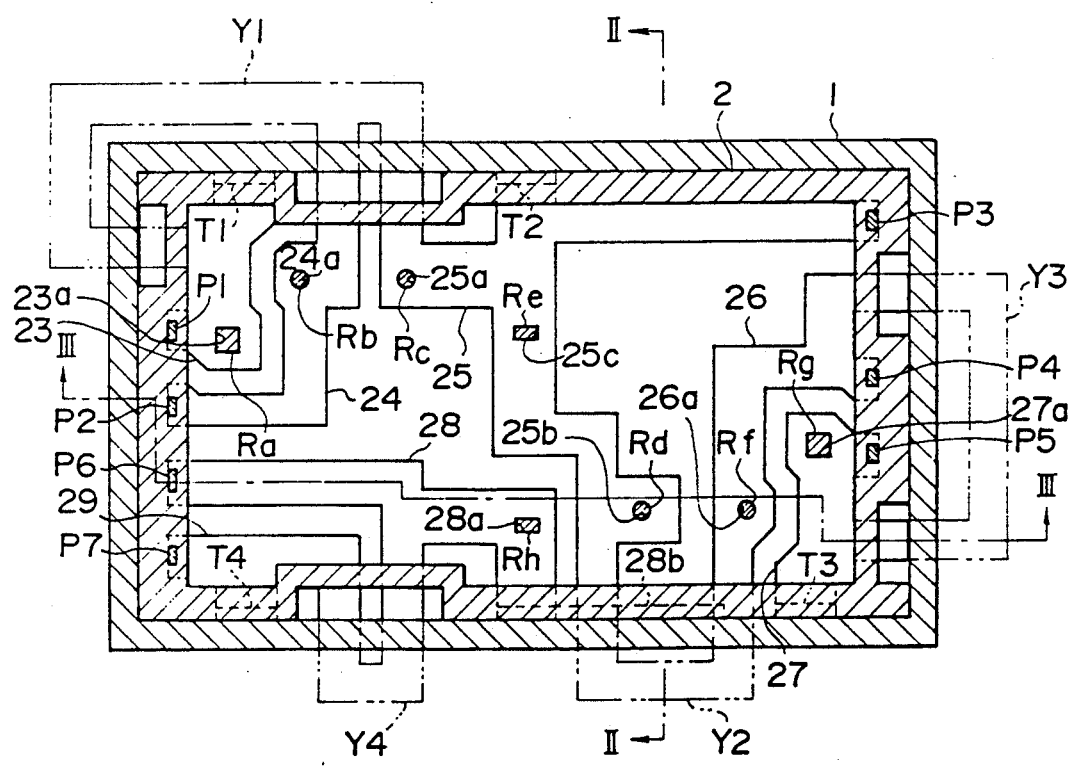

Referring first to FIGS. 2 to 4, a switch case 1, which is a rectangular box made of plastic and is open at its bottom, is provided. A relay case 2 in the form of a rectangular tube made of a plastic is fitted within the switch case 1. The relay case 2 has claws 2a protrusively formed on its front and rear side walls as viewed in FIG. 2 (or on the left-hand and right-hand sides as viewed in FIG. 3). The relay case 2 is fixed to the switch case 1 by engaging the claws 2a with engaging holes 1a formed in the corresponding walls of the switch case 1. A rectangular printed circuit board 3 is disposed inside the switch case 1, being positioned by upper end edges of the relay case 2.

Figure 5:
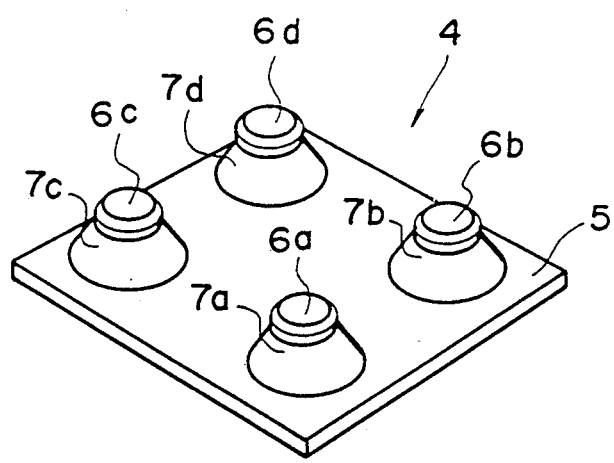

A movable contact member 4 made of, for example silicone rubber, is disposed above the printed circuit board 3. As also shown in FIG. 5, the movable contact member 4 has a base 5 in the form of a rectangular plate, four movable contact holders 6a to 6d in the form of cylinders, and support portions 7a to 7d in the form of tapered cylinders for resiliently supporting the movable contact holders 6a to 6d. The movable contact holders and the support portion are disposed at the four corners of a rectangle. The support portions 7a to 7d are formed so as to have the same shape and the same size, and therefore have equal degrees of resiliency. The thus-constructed movable contact member 4 is fixed in such a manner that, as viewed in FIG. 2, its left and right edge portions are pinched between stepped portions 1b and 1c of the switch case 1 and the printed circuit board 3. And, as viewed in FIG. 3, its front and rear edge portions are pinched between projections 1e and 1d extending from the switch case 1 and the printed, circuit board 3.

Figure 1:
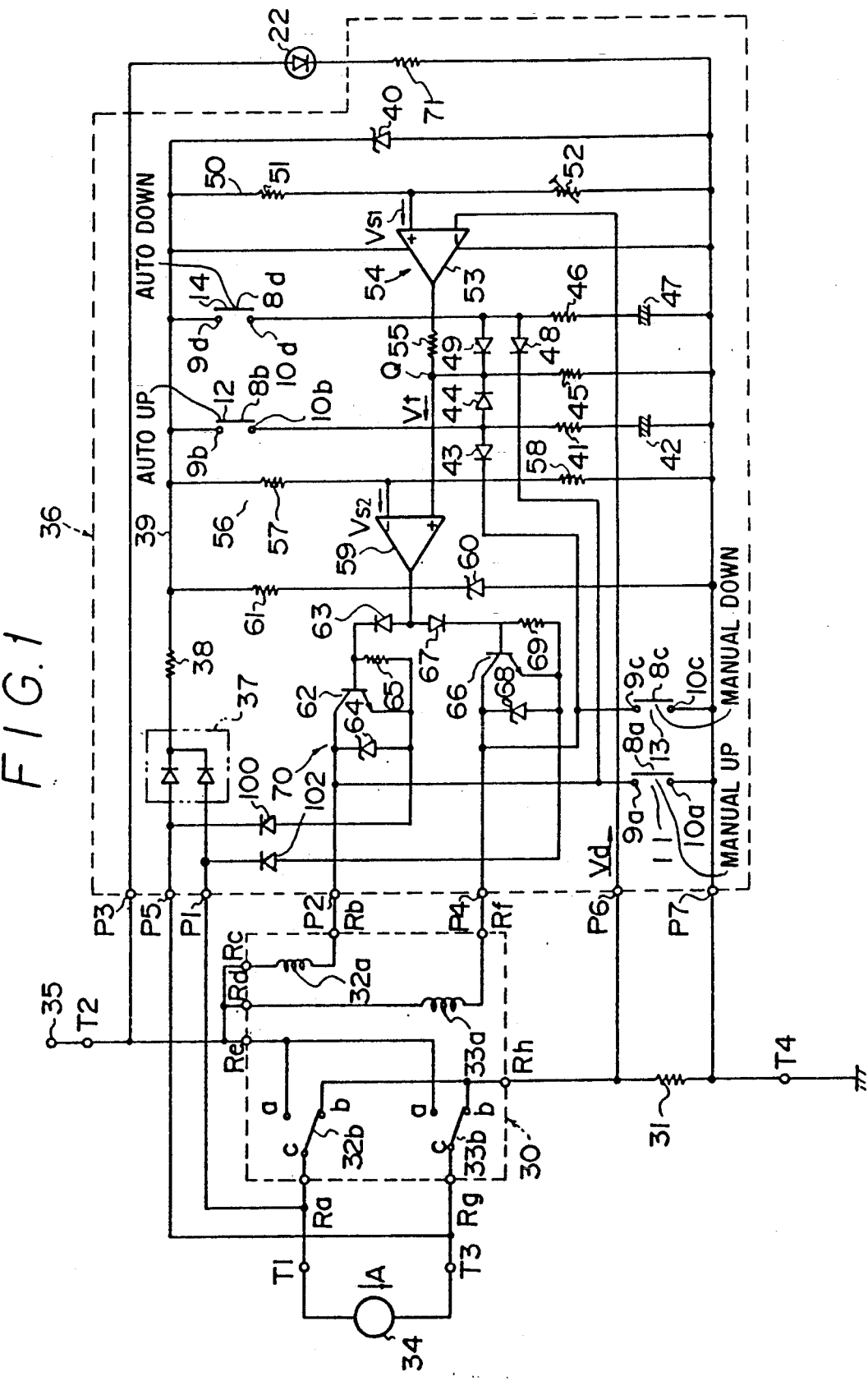

Movable contacts 8a to 8d are fixed to lower surfaces of the movable contact holders 6a to 6d, respectively. (FIG. 2 and 3 show the movable contacts 8a to 8c corresponding to the holders 6a to 6c alone while FIG. 1 shows the movable contact 8d.) Four pairs of stationary contacts 9a to 9d and 10a to 10d are formed on the printed circuit board by utilizing printed circuit patterns formed thereon. (FIGS. 2 and 3 show the contacts 9a, 10a, 9b,and 9c alone while FIG. 1 shows the others.) The movable contact holder 6a, the movable contact 8a and the stationary contacts 9a and 10a constitute a manual-up switch 11 provided as a first manual mode switch. Further, the movable contact holder 6b, the movable contact 8b and the stationary contacts 9b and 10b constitute an auto-up switch 12 provides as a first automatic mode switch; the movable contact holder 6c, the movable contact 8c and the stationary contacts 9c and 10c, a manual-down switch 13 are provided as a first manual mode switch; and the movable contact holder 6d, the movable contact 8d and the stationary contacts 9d and 10d, an auto-down switch 14 are provided as a second automatic mode switch (refer to FIG. 1). If the movable contact holders 6a to 6d are depressed, the pairs of stationary contacts 9a to 9d and 10a to 10d are bridged to turn on the switches 11 to 14. If the operation of depressing the movable contact holders 6a to 6d are thereafter stopped, the movable contact holders 6a to 6d are returned by the forces based on elastic deformations of the support portion 7a to 7d, thereby releasing the contacts from the bridged state and turning off the switches 11 to 14.

The switch case 1 has a protruding portion if which is formed as its upper wall portion facing the movable contact holders 6a to 6b so as to define an accommodation chamber 15 which extends in the widthwise direction as viewed in FIG. 2. The switch case also has a protruding portion 1g similar to the protruding portion 1f and facing the movable contact holders 6c and 6d. The protruding portion 1g defines an accommodation chamber 16. Each of the protruding portions 1f and 1g has an opening hole (no reference symbol) which is offset to the left as viewed in FIG. 2. A first pressing piece 17 is disposed in the accommodation chamber 15. The pressing piece 17 is a lengthwise member bridged over the movable holders 6a and 6b with its longitudinal axis extending in the widthwise direction as viewed in FIG. 2. The pressing piece 17 has a projection 17a integrally formed on its upper surface and offset to the left as viewed in FIG. 2. The projection 17a projects upward through the opening of the protruding portion 1f. That is, the position of the first pressing piece 17 is selected so that an external force is applied to the projection 17a at a position deviated from the center of the distance between the movable contact holders 6a and 6b. A second pressing piece 18 is disposed in the accommodation chamber 16. The pressing piece 18 is a lengthwise member bridged over the movable holders 6c and 6d and has a projection 18a formed at the same position as the projection 17a of the first pressing piece 17. The projection 18a projects upward through the opening of the protruding portion 1g. That is, the position of the second pressing piece 18 is selected so that on external force is applied to the projection 18a at a position deviated from the center between the movable contact holders 6c and 6d.

A pair of knob support portions 19 and 20 are integrally formed on the upper wall of the switch case 1 and spaced apart from each other in the widthwise direction of the switch case 1. The knob support portions 19 and 20 have outer surfaces on which axial support portions 19a and 20a are formed. An operation knob (not shown) is supported on the knob support portions 19 and 20 so as to be rotatable about the knob support portions 19a and 20a. The projections 17a and 18a of the first and second pressing pieces 17 and 18 are depressed by the rotary operation of the operation knob. A cylindrical light source housing 21 is integrally formed on an upper wall portion of the switch case 1, as shown in FIG. 3. A light emitting diode 22 for illuminating the switch is housed within the light source housing 21. The unillustrated operation knob is of a shape that covers the light emitting diode 22, and has a light transmitting portion through which light emitted from the light emitting diode 22 is exited to the outside.

Electro-conductive plates 23 to 29 having shapes such as those illustrated in FIG. 4 are insert-molded to the relay case 2. Before insert molding, the electro-conductive plates 23 to 29 are integrally connected by connecting plates Y1 to Y4 indicated by the double-dot-dash line in FIG. 4. The electro-conductive plates 23 to 25 are connected by the connecting plates Y1, the electro-conductive plates 25 and 26 by the connecting plate Y2, the electro-conductive plates 26 and 27 by the connecting plate Y3, and the electro-conductive plates 28 and 29 by the connecting plate Y4. The connecting plates Y1 to Y4 are removed by being cut off after insert formation. It is thereby possible to maintain the positional relationship between the electro-conductive plates 23 to 29 with accuracy.

The electro-conductive plates 23, 25, 27, and 29 have terminals T1 to T4 which are bent downward and which project outward from the lower end of the relay case 2. The electro-conductive plates 23 to 29 have terminals P1 to P7 which are bent upward and which project outward from the upper end of the relay case 2. The terminals P1 to P7 project through the printed circuit board 3. Through holes 23a, 24a, 26a, 27a, and 28a are formed in the electro-conductive plates 23, 24, 26, 27, and 28. Through holes 25a to 25c are formed in the electro-conductive plate 2. A relay device 30 (whose internal construction is not illustrated and which includes two relays as will be understood later) is provided as a switching device having seven terminals Ra to Rh and accommodated in the relay case 2. The terminals Ra to Rh are respectively passed through the through holes 23a, 24a, 25a to 25c, 26a, 27a, 28a and are connected by soldering to the corresponding electro-conductive plates 23 to 28. The electro-conductive plate 28 has a connection extension 28b having a cranked shape (refer to FIG. 3) which is bent downward and extends to a portion of the relay case 2 in the vicinity of the lower end thereof. A resistor 31 (refer to FIGS. 1 and 2) is connected between the lower end of the extension 28b and an intermediate portion of the terminal T4. As shown in FIG. 2, the switch case 1 and the relay case 2 respectively have output openings 1h and 2b formed at the position of the resistor 31 in order to dissipate heat thereof.

As a result of the above-described construction, the terminals Ra to Rh of the relay device 30 and the resistor 31 are connected to the terminals T1 to T4, P1 to P7, as shown in the electrical connection diagram in FIG. 1. The description will be made below with respect to the arrangement shown in FIG. 1. The terminal Rb is connected to the terminal P2. The terminals Rc, Rd, and Re are connected in common to the terminals T2 and P3, and the terminal Rf is connected to the terminal P4. The terminal Rh is connected to the terminal P6 and to one end of the resistor 31. The other end of the resistor 31 is connected to the terminals T4 and P7. Further, the terminal Rg is connected to the terminals T3 and P5. The relay device 30 has two excitation coils 32a and 33a and two relay switches 32b and 33b and operates with the energization and deenergization these coils. The excitation coils 32a and 33a are connected between the terminals Rc and Rb and between the terminals Rd and Rf, respectively. The relay switches 32b and 33b have common terminals C connected to the terminals Ra and Rg separately from each other, ordinarily open terminals connected in common to the terminal Re, and ordinarily closed terminals b connected in common to the terminal Rh.

The terminals T1 and T3 are connected to input terminals of a dc motor 34 for driving the window regulator. In this example, a window glass (not shown) is moved upward to close the window if a current for energizing the motor 34 flows in the normal direction (indicated by Arrow A in FIG. 1), or is moved downward to open the window if the current flows in the reverse direction (opposite to the direction of the arrow A). The terminal T2 is connected to a power source terminal 35, and the terminal T4 is connected to a ground terminal (not shown). The power source terminal 35 is connected to the positive terminal of a vehicle battery via an ignition contact (both not shown).

A control circuit 36 is arranged on two surfaces of the printed circuit board 3 and has a construction described below.

The control circuit 36 includes the manual-up switch 11, the auto-up switch 12, the manual-down switch 13 and the auto-down switch 14. The manual-up switch 11 is connected between the terminals P2 and P7, and the manual-down switch 13 is connected between the terminals P4 and P7. Consequently, during the "ON" state of the manual-up switch 11, the excitation coil 32a of the relay device 30 is energized. The contacts c and a of the relay switch 32b come in contact with each other, thereby forming the circuit for the normal-direction (of the arrow A) energization of the motor 34 and thereby moving the window glass upward. During the "ON" state of the manual-down switch 13, the contacts c and a of the relay switch 33b come in contact with each other based on the excitation of the excitation coil 33a. The circuit for the reverse-direction (opposite to the direction of the arrow A) energization of the motor 34 is thereby formed, and the window glass is moved downward. During the period of time when the contacts c and a of the relay switch 32b are in contact with each other, the terminal P1 is connected to the power source terminal 35. During the time when the contacts c and a of the relay switch 33b are in contact with each other, the terminal P5 is connected to the power source terminal 35. The terminals P1 and P5 are connected to a bus 39 via a diode OR circuit 37 and a resistor 38. The bus 39 is connected to the terminal P7 via a constant voltage diode 40 having a polarity indicated in FIG. 1. Consequently, a constant voltage is applied between the bus 39 and the terminal P7 while one of the manual-up switch 11 and the manual-down switch 13 is in the "ON" state. Since the motor 34 is supplied with the drive current via the resistor 31, a voltage Vd detected as a potential level corresponding to the load current flowing through the motor 34 of a potential level appears across the resistor 31. The detected voltage Vd is applied between the terminals P6 and P7.

The auto-up switch 12 is connected at one end to the bus 39. Connected between the other end of the auto-up switch 12 and the terminal P7 is a series circuit of a resistor 41 and a first capacitor 42 which is a timer element, a series circuit of a diode 43 having a polarity indicated in FIG. 1 and the manual-down switch 13 and a series circuit of a diode 44 having a polarity indicated in FIG. 1 and a resistor 45 corresponding to a discharge resistor in accordance with the present invention. The auto-down switch 14 is conencted at one end to the bus 39. Between the other end of the auto-down switch 14 and the terminal P7 are connected a series circuit of a resistor 46 and a second capacitor 47 which is a timer element, a series circuit of a diode 48 having a polarity indicated in FIG. 1 and the manual-up switch 11 and a series circuit of a diode 49 having a polarity indicated in FIG. 1 and the resistor 45. The first capacitor 42 and the second capacitor 47 have equal capacitances. The time constant for charging the first capacitor 42 through the resistor 41 and the time constant for charging the second capacitor 47 through the resistor 46 are set to equal values, e.g., about 0.01 sec. The time constant for discharging the first capacitor 42 through the resistors 41 and 45 and the time constant for discharging the second capacitor 47 through the resistors 46 and 45 are set to equal values. e.g., about 10 sec.

A first reference voltage generating circuit 50 is formed by connecting a resistor 51 and a trimming resistor 52 in series between the bus 39 and the terminal P7. A reference voltage $Vs_1$ is generated from a common point of connection between these resistors. A first comparator circuit 53 forms, together with the resistor 31 and the first reference voltage generating circuit 50, an auto-stop circuit 54. The first comparator circuit 53 is supplied with power between the bus 39 and the terminal P7 and functions to compare the reference voltage $Vs_1$ and the detected voltage Vd supplied from the terminal P6 with each other. The first comparator circuit 53 outputs a high-level signal (corresponding to the potential of the bus 39) when $Vs_1 > Vd$, or issues an inverted output, i.e., a low-level signal (corresponding to the potential of the terminal P7) when $Vs_1 \leq Vd$. The first comparator circuit 53 has an output terminal connected to the terminal P7 via a resistor 55 and the resistor 45. The ratio of the resistances of the resistor 55 and 45 is set to, for example, about 1/10.

A second reference voltage generating circuit 56 is formed by connecting resistors 57 and 58 in series between the bus 39 and the terminal P7. A reference voltage $Vs_2$ is generated from a common point of connection between these resistors. A second comparator circuit 59 functions to compare the reference voltage $Vs_2$ and a divided voltage Vt supplied from the common point Q of connection between the resistors 55 and 45. The second comparator circuit 59 outputs a high-level signal (corresponding to the potential of the bus 39) when $Vs_2 < Vt$, or outputs a low-level signal (corresponding to the potential of the terminal P7) when $Vs_2 \geq Vt$. The second comparator circuit 59 has an output terminal connected to the terminal P7 via a constant voltage diode 60 having a polarity indicated in FIG. 1 and also connected to the bus 39 via a resistor 61. A NPN transistor 62 serves as a switching device which is turned on by the output from the second comparator circuit 59. The collector of the NPN transistor 62 is connected to the terminal P2, the emitter to the terminal 5 via a diode 100, and the base to the output terminal of the second comparator circuit 59 via a diode 63 having a polarity indicated in FIG. 1. A constant voltage diode 64 having a polarity indicated in FIG. 1 is connected between the collector and the emitter of the transistor 62. A resistor 65 is connected between the base and the emitter. An NPN transistor 66 serves as a switching device which is turned on by the output from the second comparator circuit 59. The collector of the NPN transistor 66 is connected to the terminal P4, the emitter to the terminal P1 via a diode 102, and the base to the output terminal of the second comparator circuit 59 via a diode 67 having a polarity indicated in FIG. 1. A constant voltage diode 68 having a polarity indicated in FIG. 1 is connected between the collector and the emitter of the transistor 66. A resistor 69 is connected between the base and the emitter. According to the present invention, a retention circuit 70 is formed by the first capacitor 42, the second capacitor 47, the resistors 41, 45, and 46, the second reference voltage generating circuit 56, the second comparator circuit 59, transistors 62 and 66, the diodes 44, 49, 63, and 67 and so on.

A series circuit of a current limiting resistor 71 and the light emitting diode 22 is connected between the terminals P3 and P7. During the on state of the ignition switch (not shown), the light emitting diode 22 is energized to illuminate the operation knob (not shown).

The operation of the above-described arrangement will be described below. The operation of the manual-up switch 11, the auto-up switch 12, the manual down switch 13 and the auto-down switch 14 will first be described with reference to FIG. 6. The unillustrated operation knob is operated so as to apply an operational depressing force to, for example, the projections 17a of the pressing piece 17, thereby applying an operational depressing force to the movable contact holders 6a and 6b corresponding to the manual-up switch 11 and the auto-up switch 12 against the force which is based on the elastic deformation of the corresponding support portions 7a and 7b. Since the first pressing piece 17 is bridged over the movable contact holders 6a and 6b and since the projection 17a, to which an operational depressing force is applied from the outside and is offset from the center of the distance between the movable contact holders 6a and 6b to the side of the movable contact holder 6a, the depressing moment applied to the movable contact holder 6a closer to the projection 17a is larger than that applied to the contact holder 6b. Since in this case the degrees of resiliency of the support portions 7a and 7b are generally equal to each other, the support portion 7a is first to buckle as shown in FIG. 6(b). When pressed in the state shown in FIG. 6(b), the stationary contacts 9a and 10a are thereby bridged by the movable contact 8a, thereby turning on the manual-up switch 11.

Figure 6A:
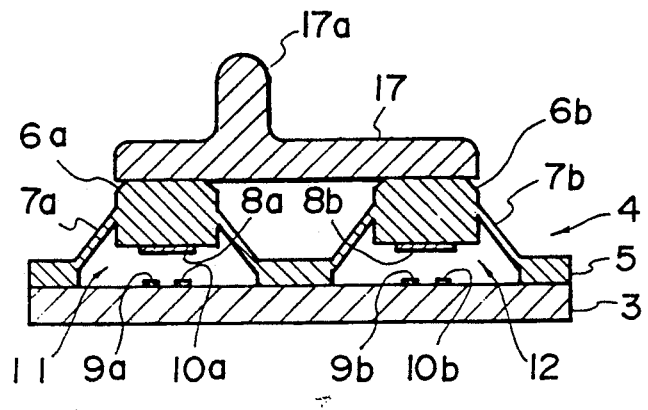
FIGS. 6(a) to 6(c) are longitudinal sectional views of essential portions in different states.
Figure 6B:
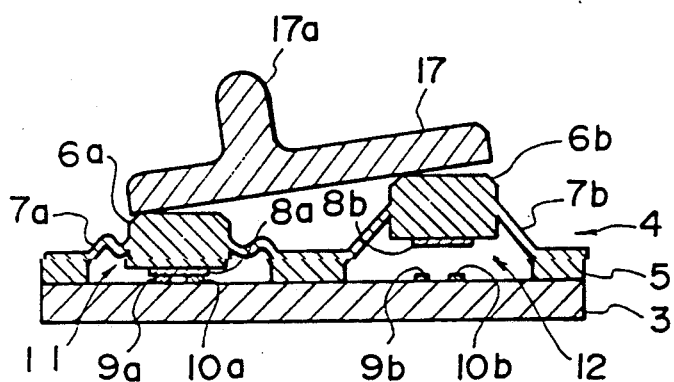
Figure 6C:
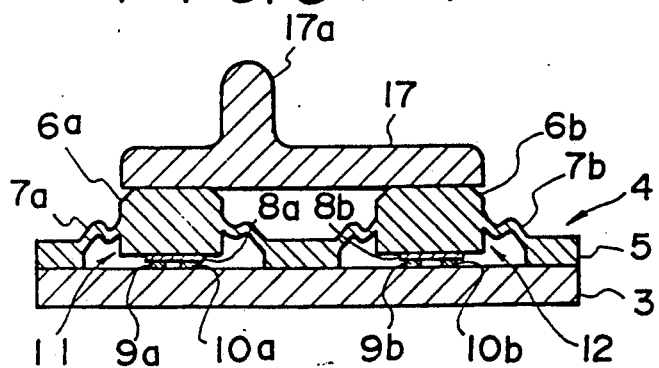

If in this state the operation of the operation knob (or the operation of depressing the first pressing piece 17) is stopped, the support portion 7a, which is buckled as described above, is restored to its non-deformed state shown in FIG. 6(a) to turn off the manual-up switch 11. If the first pressing piece 17 is further depressed by the operation knob, the movable contact holder 6b is depressed because the movable contact holder 6a is stopped from being further depressed. The support portion 7b corresponding to the movable contact holder 6b is thereby buckled as shown in FIG. 6(c) until the stationary contacts 9b and 10b are bridged, thereby turning on the auto-up switch 12.

When each of the up switches 11 and 12 is turned on, the support portion 7a or 7b is buckled and the movement of the movable contact holder 6a or 6b is limited. The operator can therefore feel a moderate resistance when the "ON" state of the up switch 11 or 12 is established. If, the up switches 11 and 12 are in the above-described state, the operation of the operating knob is stopped, the buckled support portions 7b and 7a successively restore to non-deformed states, and the auto-up switch 12 and the manual-up switch 11 are successively and correspondingly turned off. In a case where an operational depressing force is applied to the projection 18a of the second pressing piece 18 and the depressing operation is thereafter stopped, the manual-down switch 13 and the auto-down switch 14 are turned on and off in the same manner as in the above case. Specifically, the operator can feel a moderate resistance when the "ON" state is established.

Next, the operation of the electrical arrangement shown in FIG. 1 will be described below.

a) Moving the window glass upward or downward in manual mode

To move the window glass upward, the manual-up switch 11 is turned on. Then, as already described, the excitation coil 32a of the relay device 30 is energized so as to connect the contacts c and a of the relay switch 32b. This forms a circuit for normal-direction energization or the motor 34 which moves the window glass upward. If the manual-up switch 11 is turned off during upward movement of the window glass, the relay switch 32b is returned to the "ON" state in which the contacts c and b are connected in response to deenergization of the excitation coil 32a. This de-energizes the motor 34 and terminates the upward movement of the window. To move the window glass downward, the manual-down switch 13 is turned on. The excitation coil 33a of the relay device 30 is thereby energized so as to connect the contacts c and a of the relay switch 33b. This forms a circuit for reverse-direction energization of the motor 34 which moves the window glass downward. If the manual-down switch 13 is turned off during downward movement of the window glass, the relay switch 33b is returned to the "ON" state in which the contacts c and b are connected. This de-energizes the motor 34 and terminates the downward movement of the window.

b) Moving the window glass upward in automatic mode

At the time the auto-up switch 12 (refer to 106 of FIG. 8) is turned on (refer to 103 of FIG. 8), the manual-up switch 11 is turned on. The contacts c and a of the relay switch 32b are connected in response to the "ON" state of the auto-up switch (refer to 106 of FIG. 8) and the excitation coil 32a are energized. This drives the motor 34 and correspondingly starts moving the window glass upward (refer to 112 of FIG. 8). When the auto-up switch 12 has been turned on, the first capacitor 42 is charged through the resistor 41 in a very short time (actually, at least about 0.01 sec.). After the capacitor has been fully charged, no charging current flows and the power source voltage is applied to the common contact point Q between the resistors 45 and 55 via the auto-up switch 12 and the diode 44. The divided voltage Vt at the common contact point Q, therefore, becomes higher than the reference voltage $Vs_2$ supplied from the second reference voltage generating circuit 56. The output of the second comparator circuit 59 (refer to 104 of FIG. 8) is thereby changed to a high level signal (refer to 108 of FIG. 8), and the high level signal is supplied to the bases of the transistors 62 and 66 through the diodes 63 and 67, respectively. At this time, the emitter of the transistor 62 is connected to ground via the diode 100, the terminal P5, the contacts c and b of the relay switch 33b and the resistor 31 are therefore maintained at a comparatively low potential level. On the other hand, the emitter of the transistor 66 is connected to the power source terminal 35 via the diode 102, the terminal P1, the contacts c and a of the relay switch 32b and is therefore maintained at a potential level corresponding to the potential of the power source terminal 35. In consequence, transistor 62 is turned on while the transistor 66 is not turned on. This "ON" state of the transistor 62 is maintained until the output from the second comparator circuit 59 is changed to the low-level signal (refer to 110 of FIG. 8), that is, it is maintained for a period of time T (refer to 108 of FIG. 8) before the moment at which the divided voltage Vt becomes equal to or lower than the reference voltage $Vs_2$ as the charge in the first capacitor 42 is discharged through the resistor 45 or 55. During this "ON" state of the transistor 62, the circuit for energizing the relay coil 32a is formed through the collector and emitter of the transistor 62, the diode 100, the terminal P5, the contacts c and b of the relay switch 33b and the resistor 31, thereby enabling the circuit for normal-direction energization of the motor 34 to be continually formed even when both the auto-up switch 12 and the manual-up switch 11 are turned off afterward (refer to 116 of FIG. 8). The window glass is thereby moved (refer to 118 of FIG. 8) upward automatically.

When the window glass reaches the highest rise position (refer to 114 of FIG. 8), (window closed position) by this automatic movement, the rotor in the motor 34 is locked so that a comparatively large locked rotor current flows through the motor 34, and the voltage across the resistor 31 correspondingly increases. When, in response to this increase in voltage, the detected voltage Vd applied to the terminal P6 becomes higher than the reference voltage $Vs_1$ from the first reference voltage generating circuit 50, the output from the first comparator circuit 53 is changed to a low-level signal (at the potential of the terminal P7). Then, the charge in the first capacitor 42 is discharged through the resistor 41, the diode 44 and the resistor 55. Correspondingly, the divided voltage Vt at the connection point Q becomes lower than the reference voltage $Vs_2$ from the second reference voltage generating circuit 56. As a result, the output from the second comparator circuit 59 is changed to a low-level signal to turn off the transistor 62. Excitation of the excitation coil 32a is thereby stopped to return the relay switch 32b to the "ON" state in which the contacts c and b are connected, and the circuit for normal-direction energization of the motor 34 is thereby disconnected, thereby stopping the window glass at the highest rise position. The time constant for discharging the first capacitor 42 through the resistors 41 and 55 is set to a value suitable for tightly closing the window glass.

Figure 8:
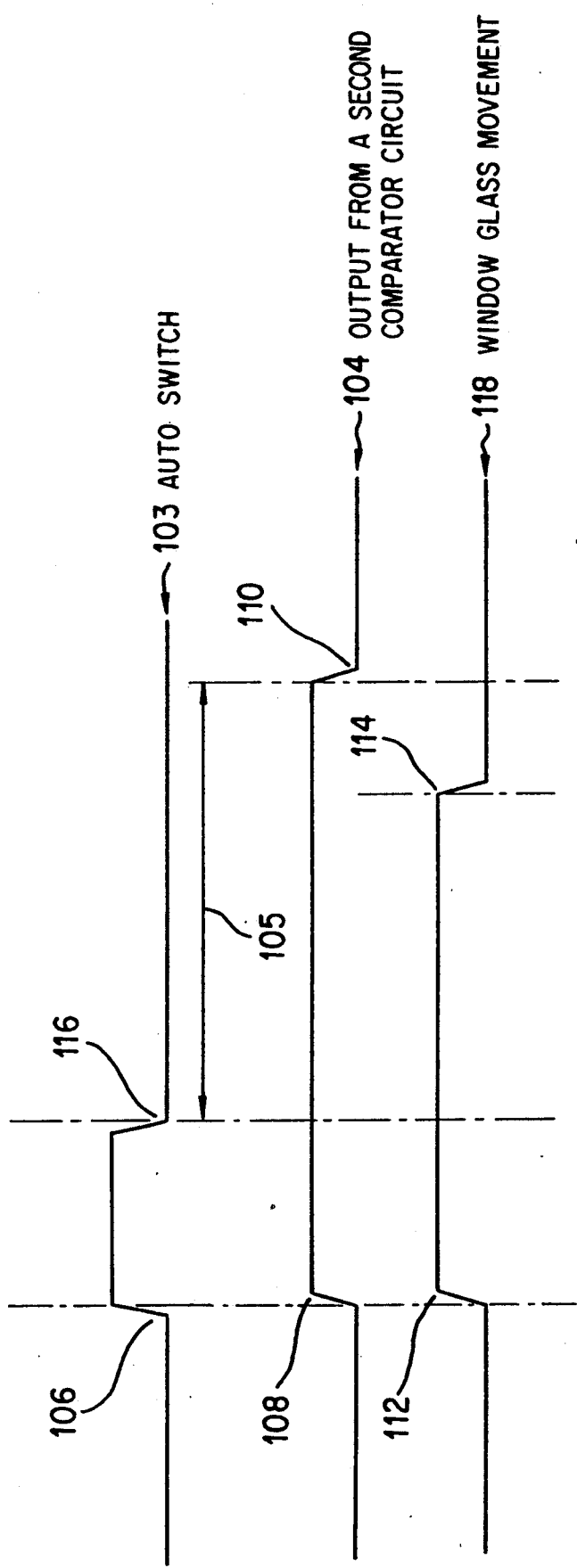
FIG. 8 is a timing diagram of the first embodiment.

As mentioned above, there is a possibility of an increase in the locked-rotor current flowing through the motor 34 due to an increase in the temperature of the motor winding. There is, therefore, a possibility that the detected voltage Vd does not exceed the reference voltage $Vs_1$ in a case where the motor 34 is driven in the automatic mode as described above. In this event, there is a risk of the occurrence of an abnormal state in which the energization of the motor 34 uncontrollably continues and, hence, a risk of the occurrence of the abnormal heating of the winding of the motor 34, resulting in some cases, in the burning of the winding. In this embodiment, when the time T (refer to 109 of FIG. 8) set as the discharge time of a discharge circuit consisting of the resistor 45 and the first capacitor 42, that is, the timer element of the retention circuit 70 elapses after the moment at which the auto-up switch 12 is turned off (refer to 116 of FIG. 8), the divided voltage Vt at the common point Q of connection between the resistors 55 and 45 becomes lower than the reference voltage $Vs_2$ supplied from the reference voltage generating circuit 56. The, output from the second comparator circuit 59 (refer to 104 of FIG. 8) is thereby changed to the low-level signal (refer to 110 of FIG. 8). As a result, the transistor 62 is turned off, and the excitation of the excitation coil 32a is thereby stopped to return the relay switch 32b to the "ON" state in which the contacts c and b are connected, thereby de-energizing the motor 34. That is, (as illustrated in FIG. 8) when the predetermined time T elapses after the moment at which the auto-up switch 12 is turned off and the driving of the motor 34 in the automatic mode is started, the motor 34 is automatically de-energized, thereby preventing the occurrence or any abnormal state such as that mentioned above.

c) Moving the window glass downward in automatic mode

When the auto-down switch 14 is turned on, the manual-down switch 13 has already been turned on. The excitation coil 33a has been energized to establish the state of the relay switch 33b in which the contacts c-a are connected, thereby forming the circuit for reverse-direction energization of the motor 34 and starting the window glass moving 34 downward by the motor. After the auto-down switch 14 has been turned on, the divided voltage Vt at the common point Q of connection between the resistor 55 and 45 becomes higher than the reference voltage $Vs_2$ from the second reference voltage generating circuit 56 as the second capacitor 47 is charged. Correspondingly, the second comparator circuit 59 outputs the high-level signal. At this time, the transistor 62 is not turned on because the emitter thereof is connected to the power source terminal 35 via diode 100, the terminal P5, the contacts c and a of the relay switch 33b and is therefore maintained at a potential level corresponding to the potential of the power source terminal 35. At the same time, the transistor 66 is turned on because the emitter thereof is connected to ground via the diode 102, the terminal P1, the contacts c and d of the relay switch 32b and the resistor 31 and is therefore maintained at a comparatively low potential level. This "ON" state of the transistor 66 is maintained for a period of time T'(=T) before the moment at which the divided voltage Vt becomes equal to or lower than the reference voltage $Vs_2$ as the charge in the second capacitor 47 is discharged through the resistor 45. During maintenance of this "ON" state, the circuit for energizing the relay coil 33a is formed through the collector and emitter of the transistor 66, the diode 102, the terminal P1 the contacts c and b of the relay switch 32b and the resistor 31, thereby enabling the circuit for reverse-direction energization of the motor 34 to continually form even when both the auto-down switch 14 and the manual-down switch 13 are turned off afterward. The window glass is thereby moved downward automatically.

When the window glass moved downward in this way reaches the lowest down position (at which the window is fully opened), a comparatively large current flows through the motor 34. The output from the first comparator circuit 53 is therefore changed to the low-level signal as in the case of the above-described upward movement of the window glass, and the charge in the second capacitor 47 is discharged through the resistor 46, the diode 49 and the resistor 55. During discharge, the output from the second comparator circuit 59 is also changed to the low-level signal to turn off the transistor 66, thereby de-energizing the excitation coil 33a and, hence, the motor 34. The window glass is thereby stopped at the lowest down position. Needless to say, when the time T' set for the discharge circuit consisting of the resistor 45 and the second capacitor, that is, the time element elapses after the moment at which the auto-down switch 14 is turned off during the automatic downward movement of the window glass, the divided voltage Vt at the common point of connection between the resistors 55 and 45 becomes lower than the reference voltage $Vs_2$ supplied from the second reference voltage generating circuit 56, the output from the second comparator circuit 59 is changed to the low-level signal, and the transistor 66 is thereby turned off, resulting in the disconnection of the circuit for reverse-direction energization of the motor 34. In this case also, the occurrence of the abnormal state in which the energization of the motor 34 uncontrollably continues.

d) Stopping movement of the window glass during upward movement of the same in automatic mode During upward movement of the window glass in the automatic mode, the first capacitor 42 is in a charged state and the transistor 62 is thereby turned on. That is, the circuit for normal-direction energization of the motor 34 is formed, as can be clearly understood from the above explanation. If in this state the manual-down switch 13 is turned on for a short time, the contacts c and a of the relay switch 33b are connected to each other by the energization of the excitation coil 33a in accordance with the "ON" state of the manual-down switch 13. The opposite terminals of the motor 34 are connected to each other via the contacts c and a of the relay switches 32b and 33b, thereby de-energizing the motor 34. During the "ON" state of the manual down switch 13, the charge in the first capacitor 42 is immediately discharged through the diode 43 and the manual-down switch 13. The output from the second comparator circuit 59 is thereby changed to the low-level signal, thereby turning off the transistor 62. In consequence, the excitation coil 32a is de-energized and the relay switch 32b is returned to the "ON" state in which the contacts c and b are connected. In a case where the manual-down switch 13 is turned on for a short time and is then turned off, as in the above case, the excitation coil 33a is de-energized and the relay switch 33b is returned to the "ON" state in which the contacts c and b are connected to each other, thereby returning the regulator to the initial state in which the circuit for normal-direction energization of the motor 34 is shut off.

e) Stopping Movement of the window glass during downward movement of the same in automatic mode During downward movement of the window glass in the automatic mode, the second capacitor 47 is in a charged state and the transistor 66 is thereby turned on. That is, the circuit for reverse-direction energization of the motor 34 is formed, as can be clearly understood from the above explanation. If in this state the manual-up switch 13 is turned on for a short time, the contacts c and a of the relay switch 32b are connected to each other by the energization of the excitation coil 32a in accordance with the "ON" state of the manual-up switch 11. The opposite terminals of the motor 34 are connected to each other via the contacts c and a of the relay switches 32b and 33b, thereby de-energizing the motor 34. During the "ON" state of the manual-up switch 11, the charge in the second capacitor 47 is discharged in a moment through the diode 48 and the manual-down switch 11. The output from the second comparator circuit 59 is thereby changed to the low-level signal, thereby turning off the transistor 66. In consequence, the excitation coil 33a is de-energized and the relay switch 33b is returned to the "ON" state in which the contacts c and b are connected. In a case where the manual-down switch 13 is turned on for a short time and is then turned off as in the above case, the excitation coil 32a is de-energized and the relay switch 32b is returned to the "ON" state in which the contacts c and b are connected to each other, thereby returning the regulator to the initial state in which the circuit for reverse-direction energization of the motor 34 is shut off.

As described above, in the arrangement of the present invention, during upward or downward movement of the window glass in the automatic mode, started by the operation of the auto-up switch 12 or the auto-down switch 14, the operation of moving the window glass can be stopped by the retention circuit 70 having a time function based on the use of the first capacitor 42 or the second capacitor 47 when the predetermined time elapses after starting the operation, even if the function of the auto-stop circuit 54 for stopping the upward or downward movement (the function of stopping the motor 34 by detecting a lock-rotor current flowing therethrough) is impaired. There is therefore no risk of the motor 34 being energized for an excessively long time in the locked state and, hence, a risk of the occurrence of overheating of the motor 34 or an increase in the rate at which the vehicle battery is consumed.

As described above, the operation of moving the window glass upward or downward in the automatic mode can be cancelled by turning on the manual-down switch 13 or the manual-up switch 11. At the time of cancelling, however, it is necessary to initialize the time element. In this event, in the above-described embodiment, the operation of the time element is cancelled by forming the circuit for discharging the charge in the first capacitor 42 or the second capacitor 47 on the basis of the "ON" state of the manual-down switch 13 or the manual-up switch 11. The circuit arrangement for this cancelling in accordance with the present invention is therefore simpler as compared with the conventional system.

In the above-described embodiment, the relay device 30 is directly controlled by the manual-up switch 11 or the manual-down switch 13, which function is advantageous because it enables the operation of the motor 34 (moving the window glass upward or downward) even if a malfunction of the semiconductor devices in the control circuit 36 (e.g., transistors 62 and 66 and comparator circuits 53 and 59) takes place.

The above-described arrangement enables the two-step operation in which the auto-up switch 12 or the auto-down switch 14 are turned on by the operation of the unillustrated operation knob after the manual-up switch 11 or the manual-down switch 13 has been turned on. During this two-step operation of turning the switches 11 to 14, a suitable resistance to the movement of the operation knob is created when each of the supports 7a to 7d is buckled and the depression of operation of one of the corresponding movable contact holders 6a to 6d is limited. The time at which the depression of each of the movable holders 6a to 6d is limited corresponds to the time at which the corresponding one of the switches 11 to 14 is turned on. In consequence, the time at which the above resistance is created always coincides with the time at which the corresponding one of the switches 11 to 14 is turned on.

Figure 7:
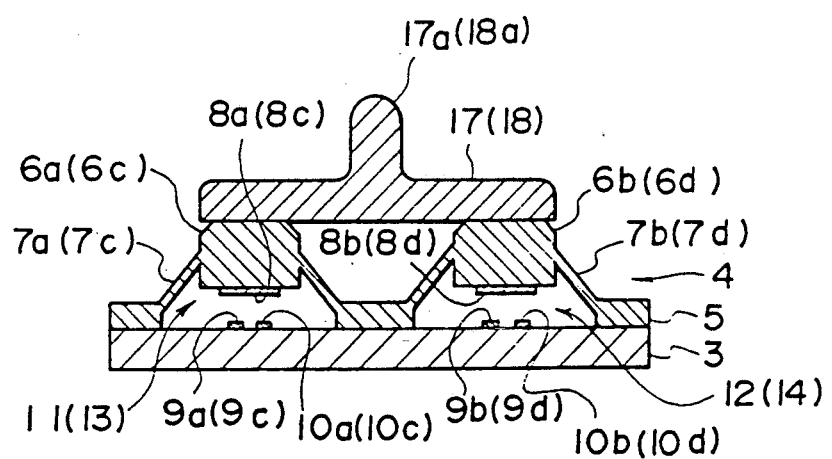
FIG. 7 is a diagram of another embodiment of the present invention corresponding to FIG. 6(a)

FIG. 7 shows another embodiment of the present invention which is essentially the same as the first embodiment but differs from the same in the following respects. Among portions 7a to 7d disposed at the positions corresponding to four movable contact holders 6a to 6d, the support portions 7b and 7d associated with the auto-up switch 12 and the auto-down switch 14 have a thickness larger than the other support portions 7a and 7c associated with the manual-up switch 11 and the manual-down switch 13 and therefore have a force based on the resiliency different from that of the support portions 7a and 7c. Projections 17a and 18a of pressing pieces 17 and 18 may also be formed at the center of the distance between the movable contact holders 6a and 6d and at the center of the distance between the movable contact holders 6c and 6d, respectively. In this arrangement, if a depressing force is applied to the pressing piece 17 or 18 through the projection 17a or 18a, the support portion 7a or 7c having the smaller resiliency force is first buckled to turn on the manual-up switch 11 or the manual-down switch 13, and the support portion 7b or 7d, having the larger resiliency force, is thereafter buckled to turn on the auto-up switch 12 or the auto-down switch 14, thereby enabling the same two-step operation as in the same of the first embodiment.

It is to be construed that the present invention is not limited to the embodiments described above in conjunction with the accompanying drawings. The present invention can be modified in other various ways without departing from its scope and spirit. For example, the structure of switching device including the automatic mode switch may be of a different type.

What is claimed is:

1. An apparatus for controlling a power window regulator which drives a motor to move a window glass and to thereby open or close the window, said apparatus comprising:
    maintenance means for maintaining an energization circuit having a timer for supplying a current to said motor to open and close the window in a state of supplying the current to said motor until a predetermined time elapses after the time at which automatic mode switches are turned on to open and close the window, said predetermined time being longer than the maximum of a period of time from a moment at which the "ON" operation of said automatic mode switch is canceled to a moment at which the window glass is moved to a limit position;

manual switch to manually open and close the window;

means for detecting the current flowing through the motor;

means for canceling the current supplying state maintained by said maintenance means when the current flowing through said motor exceeds a predetermined value; and wherein said timer is immediately reset in response to discharging a capacitor through said manual switch when said manual switch is turned on for moving the window to one of an open position and a closed position while said maintenance means is maintaining said energization circuit for moving the window to the other of the open and closed position.

2. An apparatus for controlling a power window regulator according to claim 1, wherein said maintenance means includes:

a charge/discharge circuit capable of initiating a charge when said automatic mode switch is turned on and capable of initiating a discharge when the "ON" operation of said automatic mode switch is cancelled; and a switching device capable of being turned on when the voltage of the charge accumulated by said charge/discharge circuit is higher than a predetermined value in order to keep said energization circuit for supplying the current to said motor capable of supplying the current to said motor.

3. An apparatus for controlling a power window regulator according to claim 2, wherein said charge/discharge circuit includes:

a capacitor in which charging is started when said automatic mode switch is turned on; and a resistor for initiating the discharge of the charge in said capacitor when the "ON" operation of said automatic mode switch is cancelled.

4. An apparatus for controlling a power window regulator according to claim 1, wherein said manual switch is capable of cancelling the current supplying state maintained by said maintenance means when turned on.

5. An apparatus for controlling a power window regulator according to claim 2, wherein said manual switch is capable of grounding said charge/discharge circuit to effect discharging when turned on.

6. An apparatus for controlling a power window regulator according to claim 3, wherein said manual switch is capable of grounding the positive terminal of said capacitor when turned on.

7. An apparatus for controlling a power window regulator according to claim 4, wherein said switch is a manual mode switch capable of forming the energization circuit for supplying the current to said motor when turned on.

8. An apparatus for controlling a power window regulator according to claim 1, wherein said timer is comprised of a capacitor, a resistor and a diode which are electrically connected.

9. An apparatus for controlling a power window regulator having a motor capable of moving a window glass in a window closing direction when energized through a first energization circuit and capable of moving the window glass in a window opening direction when energized through a second energization circuit, said apparatus comprising:

maintenance means for maintaining said first energization circuit having a timer with a first timer element in a state of supplying a current to said motor until a predetermined time elapses after the time at which a first automatic mode switch is turned on to close the window glass, and for maintaining said second energization circuit having said timer with a second timer element in a state of supplying a current to said motor until a predetermined time elapses after the time at which a second automatic mode switch is turned on to open the window glass, said predetermined time being longer than the maximum of a period of time from a moment at which the "ON" operation of said first and second automatic mode switches is canceled to a moment at which the window glass is moved to a limit position;

a first manual mode switch capable of forming said first energization circuit and canceling the state of said second energization circuit maintained by said maintenance means when turned on;

a second manual mode switch capable of forming said second energization circuit and canceling the state of said first energization circuit maintained by said maintenance means when turned on;

means for detecting the current flowing through the motor;

means for canceling the state maintained by said maintenance means when the current flowing through said motor exceeds a predetermined value; and wherein said timer with said first timer element is immediately reset in response to said second manual mode switch when said second manual mode switch is turned on and said first energization circuit is maintained in an "ON" state, and said timer with said second timer element is immediately reset in response to said first manual mode switch when said first manual mode switch is turned on and said second energization circuit is in an "ON" state.

10. An apparatus for controlling a power window regulator according to claim 9, wherein said maintenance means includes:

a first charge/discharge circuit capable of initiating a charge when said first automatic mode switch is turned on and capable of initiating a discharge when the "ON" operation of said first automatic mode switch is cancelled;

a second charge/discharge circuit capable of starting charging when said second automatic mode switch is turned on and capable of starting discharging when the "ON" operation of said second automatic mode switch is cancelled;

a first switching device capable of being turned on when the voltage of the charge accumulated by said first charge/discharge circuit is higher than a predetermined value to maintain said first energization circuit in the state of supplying the current to said motor; and a second switching device capable of being turned on when the voltage of the charge accumulated by said second charge/discharge circuit is higher than a predetermined value to said second energization circuit in the state of supplying the current to said motor.

11. An apparatus for controlling a power window regulator according to claim 10, wherein said first charge/discharge circuit includes:
- a capacitor in which charging is initiated when said first automatic mode switch is turned on; and
- a resistor for initiating a discharge of the charge in said capacitor when the "ON" operation of said first automatic mode switch is cancelled.

12. An apparatus for controlling a power window regulator according to claim 10, wherein said second charge/discharge circuit includes:
- a capacitor in which charging is initiated when said second automatic mode switch is turned on; and
- a resistor for initiating a discharge of the charge in said capacitor when the "ON" operation of said second automatic mode switch is cancelled.

13. An apparatus for controlling a power window regulator according to claim 9, wherein said maintenance means includes:
- a first capacitor in which charging is initiated when said first automatic mode switch is turned on;
- a second capacitor in which charging is intiated when said second automatic mode switch is turned on;
- a resistor for initiating a discharge of the charge in said first capacitor when the "ON" operation of said first automatic mode switch is cancelled, and for initiating a discharge of the charge in said second capacitor when the "ON" operation of said second automatic mode switch is cancelled;
- a first switching device capable of being turned on when the voltage of the charge accumulated by said first charge/discharge circuit is higher than a predetermined value to maintain said first energization circuit in the state of supplying the current to said motor; and
- a second switching device capable of being turned on when the voltage of the charge accumulated by said second charge/discharge circuit is higher than a predetermined value to maintain said second energization circuit in the state of supplying the current to said motor.

14. An apparatus for controlling a power window regulator according to claim 10, wherein said first manual mode switch is capable of grounding said second charge/discharge circuit to effect discharging.

15. An apparatus for controlling a power window regulator according to claim 10, wherein said second manual mode switch is capable of grounding said first charge/discharge circuit to effect discharging.

16. An apparatus for controlling a power window regulator according to claim 11, wherein said second manual mode switch is capable of grounding the positive terminal of said capacitor to effect discharging.

17. An apparatus for controlling a power window regulator according to claim 12, wherein said first manual mode switch is capable of grounding the positive terminal of said capacitor to effect discharging.

18. An apparatus for controlling a power window regulator according to claim 13, wherein said first manual mode switch is capable of grounding the positive terminal of said second capacitor to effect discharging.

19. An apparatus for controlling a power window regulator according to claim 13, wherein said second manual mode switch is capable of grounding the positive terminal of said first capacitor to effect discharging.

20. An apparatus for controlling a power window regulator according to claim 9, wherein said first timer element is comprised of a first capacitor, a first resistor and a first diode which are electrically connected, and said second timer element is comprised of a second capacitor, a second resistor and a second diode which are electrically connected.

* * * * *